United States Patent [19]

Komatsu et al.

[11] 4,254,856
[45] Mar. 10, 1981

[54] COUPLER OF WINDING KEY WITH POWER SPRING

[75] Inventors: Fumito Komatsu, Shiojiri; Yasuto Kudo, Chino; Tadashi Kamijima, Nagano, all of Japan

[73] Assignee: Kabushiki Kaisha Sankyo Seiki Seisakusho, Japan

[21] Appl. No.: 17,027

[22] Filed: Mar. 2, 1979

[30] Foreign Application Priority Data

Mar. 10, 1978 [JP] Japan ............................ 53/31168[U]

[51] Int. Cl.³ ............................................ F16D 13/12
[52] U.S. Cl. .................................... 192/415; 64/30 E; 279/2 R; 279/8; 279/23 R; 403/229; 403/372
[58] Field of Search .................... 192/415, 94, 95, 96, 192/97; 74/553; 403/320, 341, 372, 277, 229; 85/32 CS, 64; 279/2 R, 8, 23; 64/27 C, 27 CT, 30 E

[56] References Cited

U.S. PATENT DOCUMENTS

| 1,704,062 | 3/1929 | Starkey ........................ 192/415 X |
| 2,105,330 | 1/1938 | Pagenkopf .................... 192/415 X |
| 3,302,509 | 2/1967 | Modrey ......................... 403/372 X |
| 3,761,189 | 9/1973 | Suzuki ........................... 192/415 X |

Primary Examiner—Kenneth Downey
Attorney, Agent, or Firm—McGlew and Tuttle

[57] ABSTRACT

A coupler of winding key with a winding shaft comprises a threaded member formed on one of the key and the shaft and a bottomed aperture formed in the other in which a coiled spring is locked against withdrawal. The threaded member is threadably engaged with the coiled spring to couple the key with the winding shaft. When the winding key is turned in a direction to spread the coiled spring, a rotating drive is transmitted to the winding shaft while the key rotates idly when it is turned in a direction to tighten the coiled spring.

13 Claims, 4 Drawing Figures

COUPLER OF WINDING KEY WITH POWER SPRING

BACKGROUND OF THE INVENTION

A power spring is frequently used as a drive source for a musical box or toys. A winding key which is used to charge the power spring is generally connected, as by threadable engagement, with a winding shaft to which one end of the power spring is secured. This allows the key to be disengaged by turning it in the opposite direction. When such a winding mechanism is used in a toy used by an infant, a risk is possible that the infant may carry the key into his mouth as it is disengaged from the spring shaft. If the key is not put into the mouth, the key itself has a number of protuberances, which make it dangerous that the key be disengaged. To prevent this, the present applicant has previously proposed a winding key clamp which prevents the winding key from being disengaged once it is threadably engaged with a winding shaft (see Japanese Utility Model Publication No. 11,516/1976).

However, with the disclosed winding key clamp, when the winding key is turned in the direction opposite from the winding direction, a rotating drive is transmitted to a driven member contained within a toy through the winding shaft, thereby applying undue stresses upon the toy and to damage it.

SUMMARY OF THE INVENTION

It is an object of the invention to provide a coupler of a winding key with power spring or the like in which a winding key which is threadably engaged with a winding shaft may be turned in a winding direction to to transmit the rotating drive to the shaft and may be turned in the opposite direction to cause an idle rotation thereof without the transmission of the rotating drive to the shaft and in which the disengagement of the winding key from the shaft is prevented to avoid risks of harm to infants and damage of the driven members.

In accordance with the invention, the coupler comprises a threaded member formed on one of a winding key and a winding shaft associated with a power spring and a bottomed aperture formed in the other in which a coiled spring is locked against withdrawal. The threaded member is threadeably engaged with the coiled spring to couple the key with the winding shaft. When the key is turned in a direction to spread the coiled spring, a rotating drive is transmitted to the shaft while the key rotates idly when it is turned in direction to tighten the coiled spring.

With the coupler of the invention, once coupled with the winding shaft, the winding key may be turned in the opposite direction from the winding shaft without transmitting a rotating drive to the winding shaft, thus preventing a damage which may be caused to driven members of a toy. Since the key, once coupled with the shaft, cannot be disengaged therefrom, no risk is caused to the infants.

DESCRIPTION OF PREFERRED EMBODIMENTS

Figure 1:
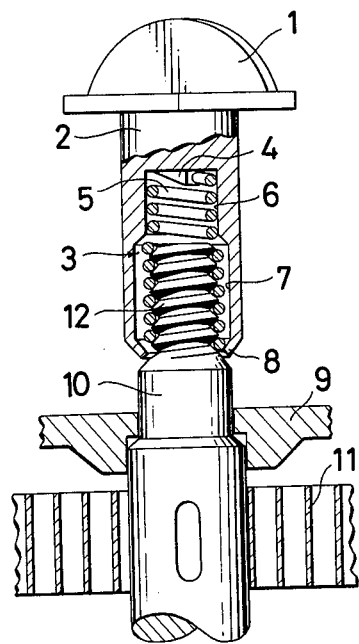
FIG. 1 is a longitudinal section of one embodiment of the invention.

Referring to FIG. 1, there is shown a coupler according to one embodiment of the invention. A hollow winding key 2 carries a knob 1 on one end, and has an interior bore or aperture 3 opening at its other opened end 8. The bore 3 is stepped, having an increased diameter portion 7 toward its open end 8 and having a reduced diameter portion 7a adjacent the bottom of the bore. A projection 4 is formed on the bottom or inner end of the bore 3, and a coiled spring 5 is received within the bore 3. The coiled spring 5 has an outer diameter which is greater than the diameter of the reduced diameter portion 6 and is less than that of the greater diameter portion 7 of the bore 3. In this manner, the spring 5 is a slight press fit in the portion 6, and is loosely fitted in the portion 7. The open end 8 of the winding key 2 is caulked or beveled inwardly, thus preventing a withdrawal of the spring 5 therefrom.

A driven member such as a frame of a toy is shown at 9, and a winding shaft 10 is rotatably supported therein. Inside the frame 9, a power spring 11 has its one end secured to the winding shaft 10. An end of the winding shaft 10 which projects externally of the frame 9 has a reduced diameter, and is formed with a male thread 12 having the same twist direction as the spring 5. The male thread 12 has a diameter which is chosen such that when it is engaged with the spring 5, it radially spreads the latter, but that when spreaded, the spreading alone cannot cause the spring 5 to bear against the greater diameter portion of the aperture 3.

Figure 2:
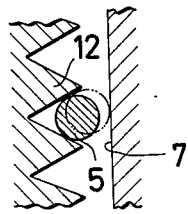
FIG. 2 is a fragmentary cross section of the coupler shown in FIG. 1, illustrating its operation.

In use, the winding key 2 containing the spring 5 is threadably engaged with the male thread 12 of the winding shaft 10. Since one end of the spring 5 bears against the projection 4, the rotation of the winding key 2 causes an integral rotation of the spring 5, which permits the male thread 12 to be forced inwardly into the spring 5 while spreading the latter until the position shown in FIG. 1 is reached where the key 2 is coupled with the winding shaft 10. Under this condition, the spring 5 located within the greater diameter portion 7 of the aperture 3 is received in a recess between adjacent threads of the male thread 12 as shown by the solid line in FIG. 2, thus leaving a small clearance with respect to the inner surface of the greater diameter portion 7 of the aperture 3. When the key 2 is turned further in the forward direction from the position shown in FIG. 1, a force is produced which spreads the spring 5 further radially outward, and hence the spring 5 will be displaced into abutment against the inner surface of the portion 7, as indicated by the phantom line in FIG. 2. Consequently, the rotating drive of the winding key 2 is positively transmitted to the winding shaft 10 through a portion of the spring 5 interposed between the portion 7 and the male thread member 12 and another portion of the spring 5 which bears against the reduced diameter portion 6 of the bore, thus enabling the winding of the power spring 11.

When the key 2 is turned in the opposite direction, the spring 5 returns into firm engagement with the threaded member 12, forming a clearance between the spring and the portion 7 of the aperture 3. The rotating drive of the key 2 functions to tighten the spring 5, so that there occurs a slip between the portion 6 of the wall of the bore 3 and the spring. Hence, the rotating drive of the key 2 is not transmitted to the winding shaft 10. In addition, the key cannot be disengaged from the shaft 10. Because the spring 5 is locked against withdrawal by the bevel of the open end 8 of the key 2, the key cannot be withdrawn from the winding shaft if it is axially pulled, thus achieving an assured prevention of withdrawal of the key.

Figure 3:
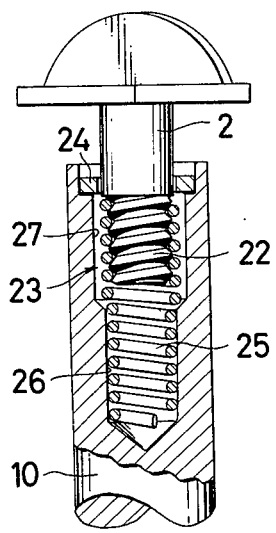
FIG. 3 is a longitudinal section of another embodiment of the invention.

FIG. 3 shows another embodiment of the invention in which the relative positioning of the aperture 3 and the male thread member 12 is reversed from that shown in FIG. 1. Specifically, in FIG. 3, one end of the key 2 is formed with a male thread member 22 and the free end of the winding shaft 10 is formed with a stepped and bottomed bore or aperture 23 therein which includes a reduced diameter portion 26 and a greater diameter portion 27. A coiled spring 25 of a diameter which is greater than the diameter of the portion 26 and which is less than the diameter of the portion 27 is received within the aperture 23, and is locked against withdrawal by an annular washer 24 which is fitted into the open end of the aperture 23. In this manner, the spring 25 is a slight press fit in the portion 26, and is loosely fitted inside the portion 27. It should be understood that the thread on the key 2 has the same twist direction as the spring 25. The diameter of the male thread portion 22 is chosen such that it radially spreads the spring 25 when it is engaged with the spring 25, but that there is left a small clearance between the spreaded spring 25 and the inner surface of the portion 27 of the aperture 23.

In use, the male thread member 22 of the key 2 is engaged with the spring 25 received within the shaft 10. As the key is turned, the male thread member 22 moves into the spring 25 as guided by the latter while spreading the latter until the key 2 is coupled with the winding shaft 10 as shown in FIG. 3. As the key 2 is further turned in this direction, a force is produced which further spreads the spring 25 to increase the diameter of the entire spring 25 until the latter bears against the inner surface of the portion 27 of the aperture 23. Thereupon, the rotating drive of the key 2 is positively transmitted to the winding shaft 10 through a portion of the spring 25 located between the portion 27 and the thread member 22 and another portion thereof abutting against the reduced diameter portion 26 of the aperture, thus transmitting the drive to a driven member, not shown.

When the key 2 is turned in the opposite direction, the spring 25 returns into engagement with the thread member 22, forming a clearance between the spring and the portion 27 of the aperture. The rotation of the key 2 acts to tighten the spring 25, whereby a slip occurs between the spring 25 and the portion 26 of the aperture wall, preventing the transmission of the drive from the key 2 to the winding shaft 10. The withdrawal of the key 2 as it is guided by the helical spring 25 is avoided. Because the spring 25 is locked against withdrawal by the washer 24, the key 2 cannot be withdrawn when it is axially pulled. It is preferred that the washer 24 be formed of a hard material so that an abrasion thereof is prevented when an end of the spring 25 rubs against the washer 24.

Figure 4:
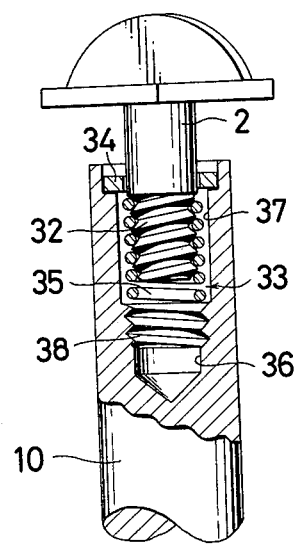
FIG. 4 is a longitudinal section of a further embodiment of the invention.

FIG. 4 shows a further embodiment of the invention which represents a modification of the embodiment shown in FIG. 3. Specifically, the winding shaft 10 is formed with an aperture 33 including a reduced diameter portion 36 in which a female thread area 38 of a short length is formed. A coiled spring 35 is received within the aperture 33 and has a close pitch. The length of the spring 35 is less than the overall length of the aperture 35. In other respects, the arrangement is similar to that shown in FIG. 3.

In use, a male thread member 32 which is formed on the winding key 2 is threadably engaged with the winding shaft 10. As the key is turned, the thread member 32 radially spreads the spring 35 while moving into the aperture 33 until the key 2 is coupled with the winding shaft 10 as shown in FIG. 4. However, because the spring 35 is wound in a close pitch, the frictional resistance acting between the thread member 32 and the spring 35 increases rapidly as the thread member 32 is increadingly engaged with the spring 35, and the integral rotation of the spring 35 with the key 2 may cause an end portion thereof to be threadably engaged with the female thread area 38. As the key 2 is turned further in the forward direction, the rotating drive from the key 2 acts to spread the spring 35 after its end has engaged a corresponding end portion of the female thread area 38, whereby the spring 35 bears against the greater diameter portion 37 of the aperture 33. Consequently, the rotating drive from the key 2 is positively transmitted to the winding shaft 10 through a portion of the spring 35 located between the portion 37 and the thread member 32 and another portion of the spring bearing against the female thread area 38, transmitting the drive to a driven member, not shown.

When the key 2 is turned in the opposite direction, the spring 35 rotates integrally with the key 2 since it is firmly engaged with the thread member 32 until the inner end of the spring 35 is disengaged from the female thread portion 38 whereupon a further rotation of the key 2 in the opposite direction causes an idle rotation of the key 2 relative to the winding shaft 10 without imparting any rotating drive thereto. Because the spring 35 is locked against withdrawal by the washer 34, the key 2 cannot be removed from the winding shaft 10.

It should be understood that in the embodiment shown in FIG. 1, the caulked portion 8 may be replaced by the use of a washer as illustrated in the embodiment shown in FIGS. 3 and 4. Similarly, in the embodiment shown in FIGS. 1 and 3, an annular spring washer having offset, opposite end faces which are staggered in the manner of a step may be disposed on the bottom of the aperture 3, 23. This provides a reinforcement of the projection 4, improving the abrasion resistance of the bottom of the aperture. When male thread members 12, 22, 32 of a reduced diameter is used, it is not always necessary to have a stepped form for the apertures 3, 23, 33.

What is claimed is:

1. A coupler of a winding key with a power spring which is wound by rotation of a winding shaft connected thereto comprising a male thread member formed on one of the winding shaft and the winding key, a bottomed aperture having an inwardly extending bevel portion at an open end thereof formed in the other of the winding shaft and the key, a coiled spring disposed and loosely fitted in the aperture, locking means formed by said bevel portion for preventing withdrawal of said spring by engagement with said bevel portion, the male thread member being threadably engaged with said coiled spring to couple the key with the winding shaft, a rotation of the key in a direction to unwind and spread the coil spring radially achieving the transmission of a rotating drive from the key to the winding shaft, and a rotation of the key in the opposite direction causing the winding of the spring on the male thread member and an idle rotation of the key.

2. A coupler according to claim 1 in which said locking means comprises a washer.

3. A coupler according to claim 1 in which the aperture comprises a stepped aperture having a reduced diameter portion which is located nearer the bottom in which said coiled spring is a slight press fit, and a greater diameter portion located adjacent the open end of said aperture in which the coiled spring is loosely fitted.

4. A coupler according to claim 1 in which said thread member is formed on the winding shaft while the aperture is formed in the winding key.

5. A coupler according to claim 1 in which said aperture is formed in the winding shaft while the thread member is formed on the winding key.

6. A coupler according to claim 1 in which the aperture comprises a stepped aperture having a reduced diameter portion located adjacent the bottom and having a female thread of a reduced length formed therein, and in which the coiled spring is wound in a close pitch.

7. A coupler for coupling a winding shaft of a power spring which is connected to the winding shaft so as to be wound thereby by rotation of said winding shaft, with a winding key, comprising a hollow tubular portion adapted to be connected to one of said winding shaft and said winding key and having a bore defined through at least a portion thereof which includes a large diameter outer portion and a portion of smaller diameter located axially adjacent to and extending inwardly from and being of a smaller diameter than said large diameter outer portion, a coil spring having at least a portion of a diameter which is freely fittable within the bore of said hollow tubular portion, a threaded shank member adapted to be connected to the other of said winding shaft and said winding key and being of a size and configuration to threadably engage into said coil spring, said shank portion being effective upon rotation of the key in one direction to expand said coil spring into engagement with the hollow tubular portion in order to rotate the power shaft with the key and to wind the power spring, and said fitted shank portion being effective upon rotation of said key in an opposite direction to tighten said spring so as to release it from said hollow tubular portion.

8. A coupler according to claim 7 including means for preventing withdrawal of said spring from said hollow tubular portion.

9. A coupler according to claim 7 wherein said hollow tubular portion comprises a hollow tubular member having at least a portion thereof including a large diameter outer portion and a portion of smaller diameter located axially adjacent and extending inwardly from and being of a smaller diameter than said large diameter portion, said coil spring having at least a large diameter portion which is disposable in the large diameter portion of said hollow tubular member and which is engagable with said smaller diameter portion so as to engage the spring with the hollow tubular member during rotation of said key in the one direction.

10. A coupler according to claim 7 wherein said hollow tubular member comprises a hollow tubular portion of said winding key, the winding shaft including a portion thereof comprising said threaded shank portion said hollow tubular member including a bore defined therethrough with at least a portion thereof including a large diameter outer portion and a portion of smaller diameter located axially adjacent and extending inwardly from and being of a smaller diameter than said larger diameter portion, said coil spring having a small diameter portion located in said smaller diameter portion and being in press fitting engagement therewith and also having a portion of larger diameter than said smaller diameter portion located in the larger diameter portion of said hollow tubular member and being spaced from the interior wall thereof, said threaded shank portion being engagable into the large diameter portion of said spring so as to engage fully therein and then expand said spring into engagement with the wall of said hollow tubular member to be driven by said winding key through engagement of the small diameter portion with the winding key tubular member as well as with the large diameter portion with the winding tubular member.

11. A coupling device according to claim 9 wherein said hollow tubular member comprises a portion of said winding shaft, said winding key having a threaded shank portion thereon engageable into said coil spring.

12. A coupler according to claim 11 wherein said coil spring includes a small diameter portion located in the small diameter portion of said tubular member and the large diameter portion located in the large diameter portion of said tubular member.

13. A coupler according to claim 7 wherein said coil spring includes only a portion of a single diameter said hollow tubular portion comprising a portion of large diameter and a portion of smaller diameter smaller than said large diameter portion and small diameter portion being threaded whereupon by turning of the winding key to engage said threaded shank portion with said spring the spring is deflected into engagement with the threaded portion of said hollow tubular member so as to affect coupling engagement of said spring with said member.

* * * * *